(12) United States Patent
Lee et al.

(10) Patent No.: US 12,354,342 B2
(45) Date of Patent: Jul. 8, 2025

(54) NETWORK FOR MULTISWEEP 3D DETECTION

(71) Applicant: Toyota Research Institute, Inc., Los Altos, CA (US)

(72) Inventors: Kuan-Hui Lee, San Jose, CA (US); Charles Christopher Ochoa, San Francisco, CA (US); Arjun Bhargava, San Francisco, CA (US); Chao Fang, Sunnyvale, CA (US); Kun-Hsin Chen, San Francisco, CA (US)

(73) Assignees: Toyota Research Institute, Inc., Los Altos, CA (US); Toyota Jidosha Kabushiki Kaisha, Toyota (JP)

( * ) Notice: Subject to any disclaimer, the term of this patent is extended or adjusted under 35 U.S.C. 154(b) by 623 days.

(21) Appl. No.: 17/733,160

(22) Filed: Apr. 29, 2022

(65) Prior Publication Data

US 2023/0351739 A1     Nov. 2, 2023

(51) Int. Cl.
*G06V 10/82*     (2022.01)
*G01S 7/41*     (2006.01)
(Continued)

(52) U.S. Cl.
CPC ............. *G06V 10/82* (2022.01); *G01S 7/417* (2013.01); *G01S 13/865* (2013.01);
(Continued)

(58) Field of Classification Search
CPC ...... G06V 10/62; G06V 10/806; G06V 10/82; G06V 20/56; G06V 10/255; G06V 10/80; G01S 7/417; G01S 13/862; G01S 13/865; G01S 13/867; G01S 13/931; G01S 17/86; G01S 17/89; G01S 17/931
See application file for complete search history.

(56) References Cited

U.S. PATENT DOCUMENTS 10,468,062 B1 * 11/2019 Levinson ................ G01S 7/497
10,839,543 B2    11/2020 Cheng et al.
(Continued)

OTHER PUBLICATIONS

Sidhu et al., "Scalable Primitives for Generalized Sensor Fusion in Autonomous Vehicles", arXiv:2112.00219v1 [cs.CV] Dec. 1, 2021, pp. 1-11 (Year: 2021).*

(Continued)

*Primary Examiner* — Nay A Maung
*Assistant Examiner* — Jose M Torres
(74) *Attorney, Agent, or Firm* — Christopher G. Darrow; Darrow Mustafa PC

(57) ABSTRACT

Systems, methods, and other embodiments described herein relate to a multi-task model that integrates recurrent models to improve handling of multi-sweep inputs. In one embodiment, a method includes acquiring sensor data from multiple modalities. The method includes separately encoding respective segments of the sensor data according to an associated one of the different modalities to form encoded features using separate encoders of a network. The method includes accumulating, in a detector, sparse features associated with sparse sensor inputs of the multiple modalities to densify the sparse features into dense features. The method includes providing observations according to the encoded features and the sparse features using the network.

20 Claims, 5 Drawing Sheets

(51) Int. Cl.

| | |
|---|---|
| *G01S 13/86* | (2006.01) |
| *G01S 13/931* | (2020.01) |
| *G01S 17/86* | (2020.01) |
| *G01S 17/89* | (2020.01) |
| *G01S 17/931* | (2020.01) |
| *G06V 10/20* | (2022.01) |
| *G06V 10/62* | (2022.01) |
| *G06V 10/80* | (2022.01) |
| *G06V 20/56* | (2022.01) |

(52) U.S. Cl.
CPC ............ *G01S 13/931* (2013.01); *G01S 17/86* (2020.01); *G01S 17/89* (2013.01); *G01S 17/931* (2020.01); *G06V 10/255* (2022.01); *G06V 10/62* (2022.01); *G06V 10/80* (2022.01); *G06V 10/806* (2022.01); *G06V 20/56* (2022.01); *G01S 13/862* (2013.01); *G01S 13/867* (2013.01)

(56) References Cited

U.S. PATENT DOCUMENTS

| | | |
|---|---|---|
| 10,878,583 B2 | 12/2020 | Schmid et al. |
| 11,024,041 B2 | 6/2021 | Natroshvili et al. |
| 11,100,399 B2 | 8/2021 | Pong et al. |
| 11,397,242 B1* | 7/2022 | Zhang ................. G06V 10/806 |
| 2020/0160559 A1* | 5/2020 | Urtasun ................. G06V 10/82 |
| 2021/0150230 A1* | 5/2021 | Smolyanskiy ......... G06V 10/82 |
| 2021/0278523 A1 | 9/2021 | Urtasun et al. |
| 2021/0312225 A1* | 10/2021 | Ku ......................... G06V 20/56 |
| 2022/0035376 A1* | 2/2022 | Laddah ................. G05D 1/247 |
| 2022/0398851 A1* | 12/2022 | Nehmadi ............... G01S 17/931 |
| 2023/0136235 A1* | 5/2023 | Wang ..................... G06V 20/64 |
| | | 701/23 |

OTHER PUBLICATIONS

Wang et al., "Multi-Modal 3D Object Detection in Autonomous Driving: a Survey", Retrieved from arXiv:2106.12735v2 [cs.CV] Jun. 25, 2021, pp. 1-28.

Goel et al., "QuadroNet: Multi-Task Learning for Real-Time Semantic Depth Aware Instance Segmentation," 2021 IEEE Winter Conference on Applications of Computer Vision (WACV), 2021, pp. 315-324.

Sidhu et al., "Scalable Primitives for Generalized Sensor Fusion in Autonomous Vehicles", Retrieved from arXiv:2112.00219v1 [cs.CV] Dec. 1, 2021, pp. 1-11.

Guizilini et al., "Sparse Auxiliary Networks for Unified Monocular Depth Prediction and Completion", Retrieved from arXiv:2103.16690v1 [cs.CV] Mar. 30, 2021, pp. 1-11.

Guizilini et al., "3D Packing for Self-Supervised Monocular Depth Estimation", Retrieved from arXiv:1905.02693v4 [cs. CV] Mar. 28, 2020, pp. 1-13.

* cited by examiner

NETWORK FOR MULTISWEEP 3D DETECTION

TECHNICAL FIELD

The subject matter described herein relates, in general, to a multi-task model for processing multiple different sensor modalities as inputs, and, more particularly, to a multi-task model that integrates recurrent models to improve handling of multi-sweep inputs.

BACKGROUND

Various devices that operate autonomously or that provide information about a surrounding environment use sensors that facilitate perceiving obstacles and additional aspects of the surrounding environment. For example, a robotic device may use information from the sensors to develop an awareness of the surrounding environment in order to navigate through the environment. In particular, the robotic device uses the perceived information to determine a 3-D structure of the environment in order to identify navigable regions and avoid potential hazards.

The ability to perceive distances, objects, and other aspects of an environment using sensor data provides the robotic device with the ability to plan movements through the environment and generally improve situational awareness about the environment. However, depending on the available onboard sensors, the robotic device may acquire a limited perspective of the environment and, thus, encounter difficulties in distinguishing aspects of the environment.

For example, a given device may have a specific set of sensors where each sensor has particular properties. Accordingly, a specific network architecture to process this arrangement of sensors is implemented by manually configuring the network to accept the different inputs and process the inputs into the desired determinations. However, this framework fails to account for different configurations of similar devices. For example, one device may have only a camera while a further device may include a camera and a radar. A single network or model is not generally flexible in order to support these disparate inputs, and the separate networks for the different configurations of sensors may also use different training data and/or training routines. As such, increased complexity may result when implementing different suites of sensors. This can be especially exacerbated by sensors that provide sparse inputs, such as LiDAR and other sweeping sensors. As such, many difficulties associated with determining observations of an environment persist that may result in reduced situational awareness for a device, and, thus, difficulties in navigating or performing other functions.

SUMMARY

In various embodiments, example systems, and methods relate to an improved multi-task model that integrates recurrent models to improve handling of multi-sweep inputs while also flexibly adapting to different sets of inputs. As noted previously, the presence of different configurations of sensors within devices can cause difficulties in that the machine perception routines associated with the different configurations are each uniquely configured and trained. This approach involves significant effort and complexity to configure the network, acquire specific training data, and perform the training. Moreover, such networks may further not consider the particular complexities of different types of inputs, such as inputs from multi-sweep sensors. Multi-sweep sensors, such as radar, LiDAR, and so on, generally provide information that is sparse over an individual scan/sweep. Thus, the provided information can be limited when attempting to generate a comprehensive perception of the surrounding environment that supports situational awareness of a device.

Accordingly, in one embodiment, a perception system implements an adaptable network. That is, the adaptable network is configurable to handle different sets of sensor inputs and also functions to implement an improved pipeline for multi-sweep sensors in order to accumulate multiple frames of sparse inputs and derive dense information from the multi-sweep sensors. For example, in one approach, the perception system includes a vision backbone that handles images as a primary sensor input and further includes a plurality of encoders that are selectively active for other sensor inputs that may be present. For example, the perception system can further handle inputs from LiDAR, radar, and even map data as additional modalities. In any case, the perception system associates the separate additional inputs with separate encoders, which may be sparse auxiliary networks (SANs).

The SANs function to encode features from the sensor data of the particular modality. In effect, encoding the features provides for normalizing the sensor data from the different modalities into a common form that can be fused together. Thus, the encoders along with the vision backbone, function to generate encoded features for the separate modalities. Of course, some of the encoded features may be sparse features since the associated modalities may provide sparse information (e.g., a sparse LiDAR). In general, the sparse information is information that represents a portion of the surrounding environment, often in a scattered manner, such as with separate scan lines of a LiDAR that provide, for example, a limited number of scan lines at different heights throughout the surrounding environment. Thus, the sparse information generally conveys sparse fragments of information about objects and surfaces in the surrounding environment.

In any case, the perception system fuses the encoded features from the vision backbone and the SANs together, then, in at least one arrangement, passes the fused sparse and/or encoded features to various decoders and/or detection heads. For example, the detection heads include object classification, semantic segmentation, instance identification, and so on. Additionally, the perception system further implements within an architecture that includes the noted elements, a depth decoder that decodes the encoded/sparse features into a depth map, which may be embodied as a pseudo-LiDAR point cloud. Thus, even though the depth map itself can include a dense representation of depth for the surrounding environment, the depth is still derived from sparse features of the sparse sensor inputs and thus may involve inference according to the sparse features that reduces accuracy.

Accordingly, the depth map is fed into a detection pipeline that includes parallel processing pipelines. For example, the separate processing paths of the pipeline may process the depth map from a current time step and a prior time step by initially encoding the depth maps and then processing the encoded maps using recurrent neural networks to accumulate features of the encoded maps. The information can then be concatenated and fed into three-dimensional detection heads for the detection of objects in the three-dimensional space of the depth maps as well as a flow head that generates scene flow (i.e., velocities associated with separate voxels). In this way, the perception system provides an adaptable multi-task network that improves the handling of sensor data from sparse multi-sweep sensors.

In one embodiment, a perception system is disclosed. The perception system includes one or more processors and a memory communicably coupled to the one or more processors. The memory stores instructions that, when executed by the one or more processors, cause the one or more processors to acquire sensor data from multiple modalities. The instructions include instructions to separately encode respective segments of the sensor data according to an associated one of the different modalities to form encoded features using separate encoders of a network. The instructions include instructions to accumulate, in a detector, sparse features associated with sparse sensor inputs of the multiple modalities to densify the sparse features into dense features. The instructions include instructions to provide observations according to the encoded features and the sparse features using the network.

In one embodiment, a non-transitory computer-readable medium including instructions that when executed by one or more processors cause the one or more processors to perform various functions is disclosed. The instructions include instructions to acquire sensor data from multiple modalities. The instructions include instructions to separately encode respective segments of the sensor data according to an associated one of the different modalities to form encoded features using separate encoders of a network. The instructions include instructions to accumulate, in a detector, sparse features associated with sparse sensor inputs of the multiple modalities to densify the sparse features into dense features. The instructions include instructions to provide observations according to the encoded features and the sparse features using the network.

In one embodiment, a method is disclosed. In one embodiment, the method includes acquiring sensor data from multiple modalities. The method includes separately encoding respective segments of the sensor data according to an associated one of the different modalities to form encoded features using separate encoders of a network. The method includes accumulating, in a detector, sparse features associated with sparse sensor inputs of the multiple modalities to densify the sparse features into dense features. The method includes providing observations according to the encoded features and the sparse features using the network

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
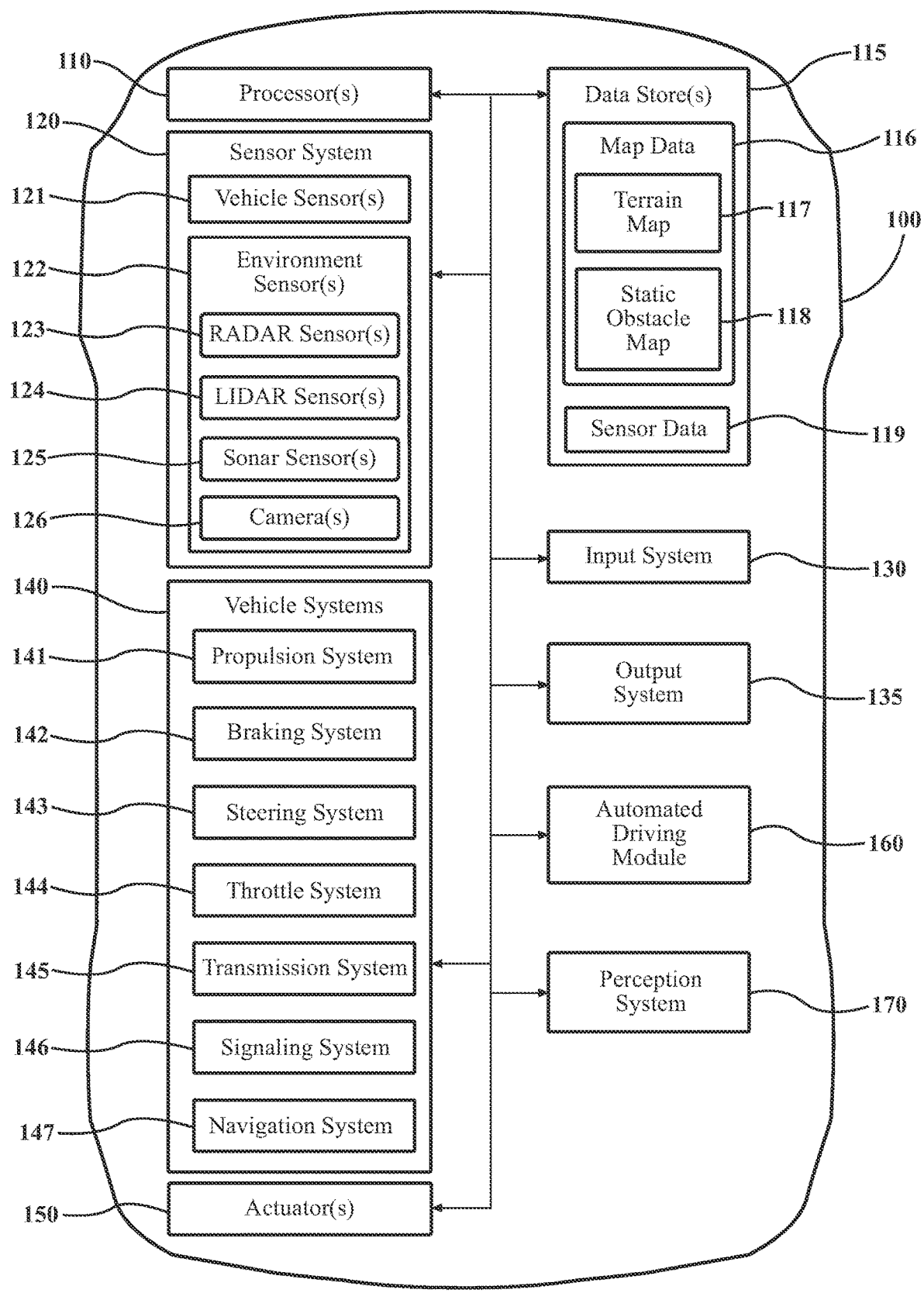
FIG. 1 illustrates one embodiment of a vehicle within which systems and methods disclosed herein may be implemented.

Systems, methods, and other embodiments are disclosed associated with an improved approach to processing multi-sweep inputs while also flexibly adapting to different sets of inputs using a multi-task network. As noted previously, the presence of different configurations of sensors within devices can cause difficulties in that the machine perception routines associated with the different configurations are each uniquely configured and trained. This approach involves significant effort and complexity to configure the network, acquire specific training data, and perform the training. Moreover, such networks may further not consider particular complexities of different types of inputs, such as inputs from multi-sweep sensors. Multi-sweep sensors, such as radar, LiDAR, and so on, generally provide information that is sparse over an individual scan/sweep. Thus, the provided information can be limited when attempting to generate a comprehensive perception of the surrounding environment that supports situational awareness of a device.

Accordingly, in one embodiment, a perception system implements an adaptable network. That is, the adaptable network is configurable to handle different sets of sensor inputs and also functions to implement an improved pipeline for multi-sweep sensors in order to accumulate multiple frames of sparse inputs and derive dense information from the multi-sweep sensors. For example, in one approach, the perception system includes a vision backbone that handles images as a primary sensor input and further includes a plurality of encoders that are selectively active for other sensor inputs that may be present. For example, the perception system can further handle inputs from LiDAR, radar, and even map data as additional modalities. In any case, the perception system associates the separate additional inputs with separate encoders, which may be sparse auxiliary networks (SANs).

The SANs function to encode features from the sensor data of the particular modality. In effect, encoding the features provides for normalizing the sensor data from the different modalities into a common form that can be fused together. Thus, the encoders along with the vision backbone function to generate encoded features for the separate modalities. Of course, some of the encoded features may be sparse features since the associated modalities may provide sparse information (e.g., a sparse LiDAR). In general, the sparse information is information that represents a portion of the surrounding environment often in a scattered manner, such as with separate scan lines of a LiDAR that provide, for example, a limited number of scan lines at different heights throughout the surrounding environment. Thus, the sparse information generally conveys sparse fragments of information about objects and surfaces in the surrounding environment.

In any case, the perception system fuses the encoded features from the vision backbone and the SANs together, then, in at least one arrangement, passes the fused sparse and/or encoded features to various decoders and/or detection heads. For example, the detection heads include object classification, semantic segmentation, instance identification, and so on. Additionally, the perception system further implements within an architecture that includes the noted elements, a depth decoder that decodes the encoded/sparse features into a depth map, which may be embodied as a pseudo-LiDAR point cloud. Thus, even though the depth map itself can include a dense representation of depth in the surrounding environment, the depth is still derived from sparse features of the sparse sensor inputs and thus may involve inference according to the sparse features that reduces accuracy. Accordingly, the depth map is fed into a detection pipeline that includes parallel processing paths. For example, the separate processing paths of the pipeline may process the depth map from a current time step and a prior time step by initially encoding the depth maps and then processing the encoded maps using recurrent neural networks to accumulate features of the encoded maps. The information can then be concatenated and fed into three-dimensional detection heads for the detection of objects in the three-dimensional space of the depth maps as well as a flow head that generates scene flow (i.e., velocities associated with separate voxels). In this way, the perception system provides an adaptable multi-task network that improves the handling of sensor data from sparse multi-sweep sensors.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may instead be a different electronic device (e.g., smartphone, surveillance camera, robot, server, etc.) that, for example, perceives an environment according to a particular set of sensor inputs, and thus benefits from the functionality discussed herein. In yet further embodiments, the vehicle 100 may instead be a statically mounted device, an embedded device, or another device that uses sparse sensor data to derive information, such as depth information, about a scene or that separately trains the multi-task model for deployment in such a device.

In any case, the vehicle 100 (or another electronic device) also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are illustrated as being located within the vehicle 100, it will be understood that one or more of these elements can be located external to the vehicle 100. Further, the elements shown may be physically separated by large distances and provided as remote services (e.g., cloud-computing services, software-as-a-service (SaaS), distributed computing service, etc.).

Some of the possible elements of the vehicle 100 are shown in FIG. 1 and will be described along with subsequent figures. However, a description of many of the elements in FIG. 1 will be provided after the discussion of FIGS. 2-5 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle 100 includes a perception system 170 that functions to train and implement a multi-task model to process monocular images and provide depth estimates and other determinations for an environment. Moreover, while depicted as a standalone component, in one or more embodiments, the perception system 170 is integrated with the automated driving module 160, or another component of the vehicle 100. The noted functions and methods will become more apparent with a further discussion of the figures.

Figure 2:
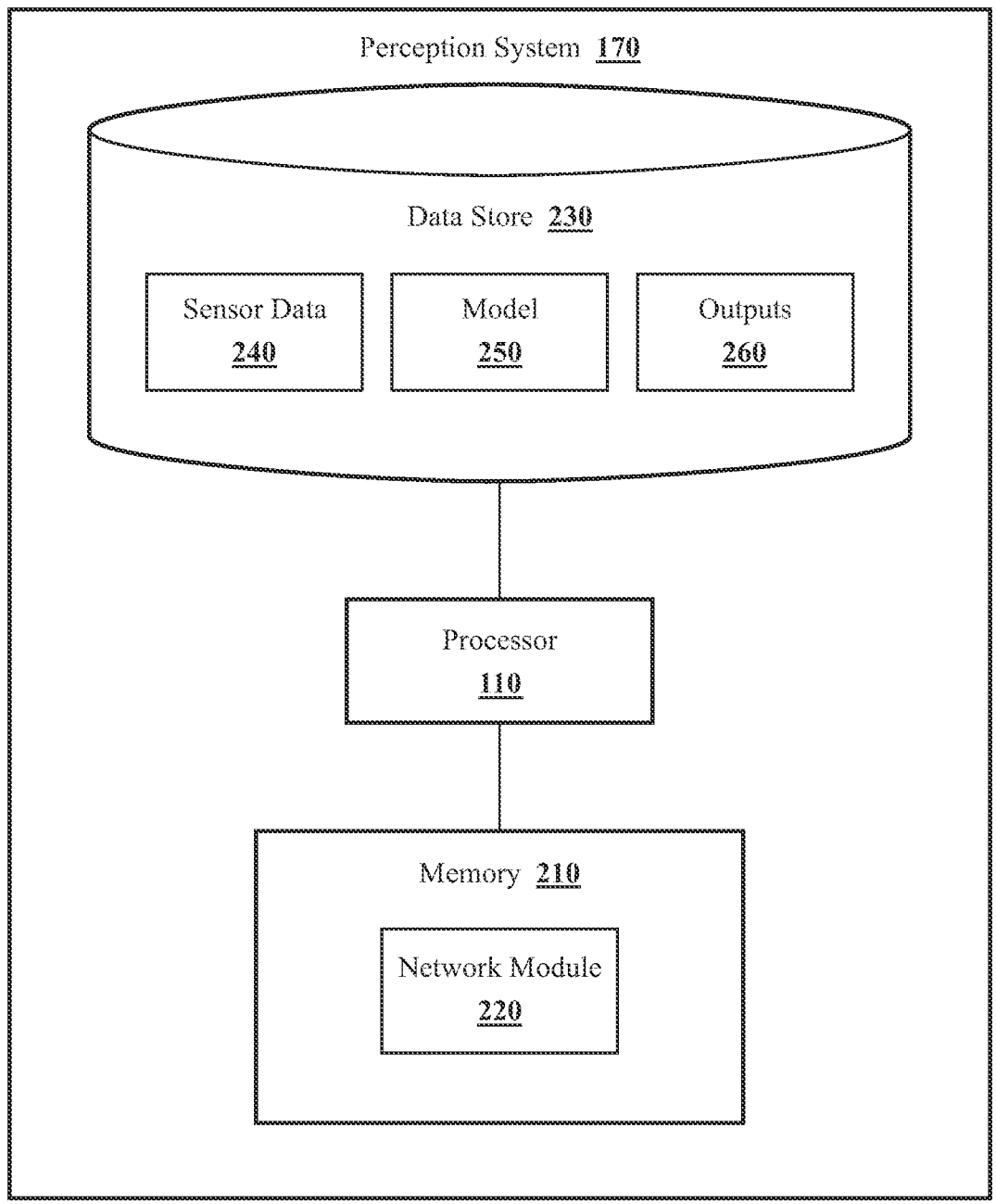
FIG. 2 illustrates one embodiment of a perception system that is associated with a multi-task model for perception.

With reference to FIG. 2, one embodiment of the perception system 170 is further illustrated. The perception system 170 is shown as including a processor 110. Accordingly, the processor 110 may be a part of the perception system 170 or the perception system 170 may access the processor 110 through a data bus or another communication path. In one or more embodiments, the processor 110 is an application-specific integrated circuit (ASIC) that is configured to implement functions associated with a network module 220. In general, the processor 110 is an electronic processor such as a microprocessor that is capable of performing various functions as described herein. In one embodiment, the perception system 170 includes a memory 210 that stores the network module 220. The memory 210 is a random-access memory (RAM), read-only memory (ROM), a hard disk drive, a flash memory, or other suitable memory for storing the module 220. The module 220 is, for example, computer-readable instructions that when executed by the processor 110 cause the processor 110 to perform the various functions disclosed herein.

Furthermore, in one embodiment, the perception system 170 includes a data store 230. The data store 230 is, in one embodiment, an electronic data structure, such as a database, that is stored in the memory 210 or another memory and that is configured with routines that can be executed by the processor 110 for analyzing stored data, providing stored data, organizing stored data, and so on. Thus, in one embodiment, the data store 230 stores data used by the module 220 in executing various functions. In one embodiment, the data store 230 includes sensor data 240, a model 250, and outputs 260 along with, for example, other information that is used by the network module 220.

While discussion of the model 250, which is the multi-task model (also referred to herein as a network architecture), generally focuses on inference, the perception system 170 may further train the model 250. That is, the network module 220, in one approach, uses training data stored in the data store 230 to perform end-to-end training of the model 250. The training data may include data for supervised and/or unsupervised/self-supervised learning, such as labeled sensor data and/or one or more monocular videos that are comprised of a plurality of frames in the form of monocular images for self-supervised learning of depth in the structure-from-motion context. In any case, the network module 220 may separately train the model 250 using an end-to-end process that involves executing the model 250 over training data that mimics actual sensor data inputs but includes labeled outputs that can be utilized as a point of comparison against produced outputs in a supervised approach. Accordingly, training the model 250, in this way, provides for a less complex approach that avoids separately training individual components of the model 250, such as separately training the encoders, vision backbone, and so on.

Figure 3:
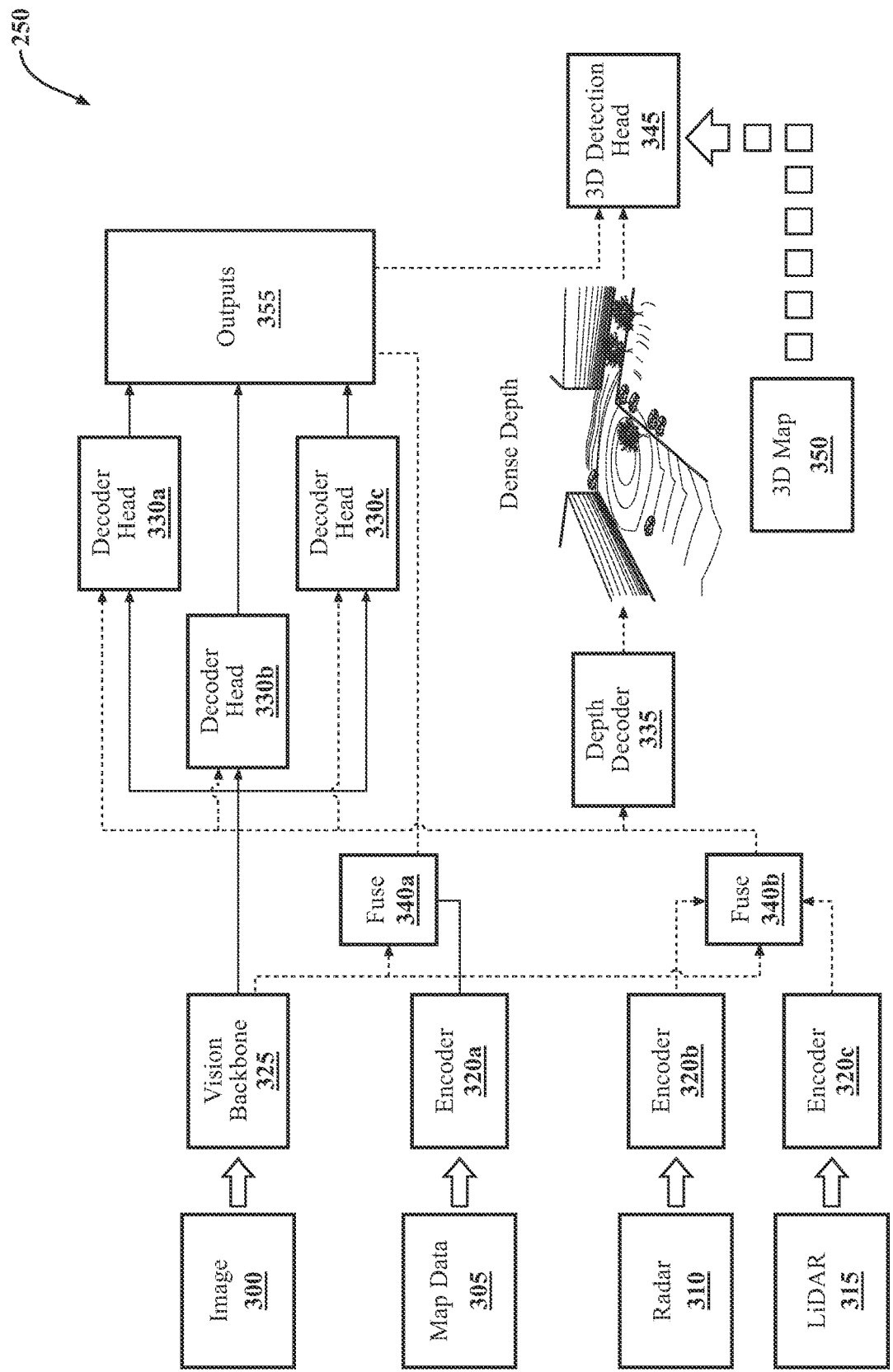
FIG. 3 illustrates one embodiment of a network architecture for a multi-task model.

With further reference to FIG. 3, a detailed view of the network architecture of the multi-task model 250 is shown. It should be appreciated that FIG. 3 illustrates an example form of the network architecture for the model 250, which may include additional components to those shown and/or fewer components than shown in various implementations. For example, as shown in FIG. 3, the model 250 includes three separate encoders 320a, 320b, and 320c. The encoders 320 are, in one approach, sparse auxiliary networks (SANs) that function to encode associated inputs into sparse features. The encoders 320 are implemented according to which of the inputs 305-315 are present for a particular implementation. Thus, when fewer modalities are present, then the model 250 is implemented with fewer of the encoders 320.

In general, the perception system 170 implements the model 250 with corresponding encoders 320 for each separate input. Thus, as shown, inputs corresponding to map data 305, radar data 310, and LiDAR data 315, which are all considered sparse inputs, have separate corresponding ones of the encoders 320a-c. The model 250 also includes a vision backbone 325 that is a separate specific encoder for image data 300. Accordingly, the vision backbone 325 and the encoders 320a-c function to separately encode the respective inputs. With particular reference to the inputs, the image 300, the radar 310, and the LiDAR 315 are the sensor data 240 from associated sensors. In particular, the radar 310 and the LiDAR 315 are sparse inputs meaning that the data produced by the associated sensors is not a comprehensive representation of a depicted scene but instead includes sparse points of data that includes gaps where no information is present. Similarly, the map data 305, may also include sparse representations of features, and the map data 305 may also be selectively included as an additional modality. In general, the map data 305 is, for example, two-dimensional map data that can indicate aspects of the environment, such as lanes on a roadway, and so on.

Returning to the encoding of the inputs, the vision backbone 325 is, for example, an encoder that is part of an encoder/decoder architecture. In this particular implementation, the vision backbone 325 is a shared encoder among multiple decoder heads 330a, 330b, and 330c, which function to perform different functions, including but not limited to semantic segmentation, instance identification, object classification, depth prediction, and so on.

The encoder architecture of the vision backbone 325 includes, in at least one approach, a set of neural network layers including convolutional components (e.g., 2D and/or 3D convolutional layers forming an encoder) that flow into deconvolutional components (e.g., 2D and/or 3D deconvolutional layers forming a decoder). In one approach, the encoder of the vision backbone 325 accepts an image as an electronic input and processes the image to extract features therefrom. The features are, in general, aspects of the image that are indicative of spatial/object information that the image intrinsically encodes. As such, encoding layers that form the encoder function to, for example, fold (i.e., adapt dimensions of a feature map to retain the features) encoded features into separate channels, iteratively reducing spatial dimensions of the image 300 while packing additional channels with information about embedded states of the features. Thus, the addition of the extra channels avoids the lossy nature of the encoding process and facilitates the preservation of more information (e.g., feature details) about the original monocular image 300.

Accordingly, in one embodiment, the vision backbone 325 is comprised of multiple encoding layers formed from a combination of two-dimensional (2D) convolutional layers, packing blocks, and residual blocks. Moreover, the separate encoding layers generate outputs in the form of encoded feature maps (also referred to as tensors), which the encoding layers provide to subsequent layers in the model 250. As such, the vision backbone 325 includes a variety of separate layers that operate on the monocular image 300, and subsequently on derived/intermediate feature maps that convert the visual information of the monocular image into embedded state information in the form of encoded features of different channels.

Accordingly, the decoders 330a-c and 335 may then function to unfold (i.e., adapt dimensions of the tensor to extract the features) the previously encoded spatial information in order to derive outputs 355 associated with a particular function of a respective one of the decoders 330a-c. That is, decoding layers of the decoders 330a-c and 335 generally function to up-sample, through sub-pixel convolutions and/or other mechanisms, the previously encoded features into the outputs 355 and dense depth for the decoder 335. In one embodiment, the decoding layers comprise unpacking blocks, two-dimensional convolutional layers, and inverse depth layers that function as output layers for different scales of the feature map.

Moreover, the model 250 can further include skip connections for providing residual information between the encoders and decoders to facilitate memory of higher-level features between the separate components. While a particular encoder/decoder architecture is generally described in relation to different components of the model 250, the model, in various approaches, may take different forms and generally functions to process the images 300 and provide the outputs 355 according to specifically trained functions.

Similarly, the encoders 320a-c, in one or more arrangements, include machine learning components, such as 2D and/or 3D convolutional layers that function to encode information of the associated sparse inputs. In one arrangement, the encoders 320a-c are sparse auxiliary networks (SANs) that function to focus feature encoding on included sparse information from the sparse inputs. In any case, the encoders 320a-c generate encoded features from the sparse information that the model 250 may then fuse together. For example, the model 250 may include one or more fusion blocks, such as blocks 340a and 340b. The fusion blocks 340a and 340b function to combine the features from the sparse inputs together and may further function to also combine features from the vision backbone 325 with the features from the encoders 320a-c. Because the encoders generally function to change a form of the inputs into the features, combining the separate features via the blocks 340a-b is simplified by virtue of the characteristics of the features normalizing the different inputs. The fusion blocks 340a and 340b may be implemented in different forms, including probabilistic algorithms, machine learning algorithms, and so on.

Subsequently, the model 250 feeds the fused features into the depth decoder 335, which functions to generate dense depth information for a scene in the form of a pseudo-LiDAR point cloud. However, because the dense depth information is the product of sparse inputs, the dense depth itself may be considered to be a sparse feature in the sense that the sparse inputs do not provide comprehensive information about the scene, and thus the decoder 335 provides significant inference about the pseudo point cloud. In any case, the pseudo point cloud is fed into a 3D detection head 345. Before discussion of the 3D detection head 345, consider that the sparse inputs are, for example, generally multi-sweep inputs. That is, for example, the sparse inputs function to iteratively scan the environment using some form of emitted energy that is then sensed when reflected from the environment. Thus, through multiple sweeps of the environment using the respective emitted energy, the sparse information is formed.

As such, the 3D detection head 345, in one arrangement, is implemented to account for the sparse and multi-sweep form of the sparse inputs. Consider FIG. 4, which illustrates an example arrangement of the 3D detection head 345. In particular, the 3D detection head 345 is split into two separate parallel processing pathways to form a parallel pipeline for dense depth information from the decoder 335 that is from a current timestep and a prior timestep. Accordingly, as shown, a first pathway 400 processes a pseudo-LiDAR point cloud 410 derived from sparse features for a first timestep (t−1) while processing pathway 405 processes a second point cloud 415 from a subsequent timestep (t). The pathways 400 and 405 are generally similar with components sharing learned weights therebetween and the second pathway 405 accepting an output of a recurrent neural network 420 of the first pathway 400. For example, as shown, the pathway 400 includes an encoder that functions to encode the point cloud 410 into a feature map. The feature map may be formed into a bird's-eye-view (BEV) perspective of the depicted scene, and may be combined with features of a 3D map 350 of a surrounding environment when available. The BEV feature embeddings are fed into the RNN 420, which may be a convolutional long-short term memory (LSTM) network. An output from the RNN 420 is then fed to a detection head, which functions to decode information from the RNN 420 into detections of objects in 3D space, which may be represented as three-dimensional bounding boxes.

Similarly, the pathway 405 processes the point cloud 415 into BEV features. An RNN 425, which may also be a convolutional LSTM, accepts the BEV feature embeddings and also an output of the RNN 420 to thereby accumulate features between separate timesteps of the multi-sweep inputs. This accumulation by the RNN 425 densifies the BEV features to improve determinations from the sparse inputs. The accumulated information is then fed into the detection head where the detection head decodes the accumulated features into determinations about objects by using 3D bounding boxes to identify locations in the environment associated with detections. The detection heads are, for example, deconvolutional layers that may be combined with further machine learning components, such as fully connected layers, skip connections with the respective encoders, and so on. In any case, the detection heads output determinations about objects in 3D space.

The detection head 345, in various arrangements, can further include a flow head 430. The flow head 430, in at least one aspect, accepts outputs from the RNNs 420 and 425 of the separate pathways 400 and 405 and processes the provided accumulated features through a comparison to identify flow (i.e., velocities) of separate voxels in the scene. The flow head 430 itself is, in one arrangement, a machine learning algorithm or, alternatively, a heuristic-based algorithm that functions to compare the separate inputs from different timesteps to produce the inferred scene flow, which is provided as one of the outputs 355. Accordingly, the multi-task model 250 improves flexibility and robustness in processing different arrangements of sensors, including multi-sweep sensors through the inclusion of RNNs within the architecture, as shown.

Figure 5:
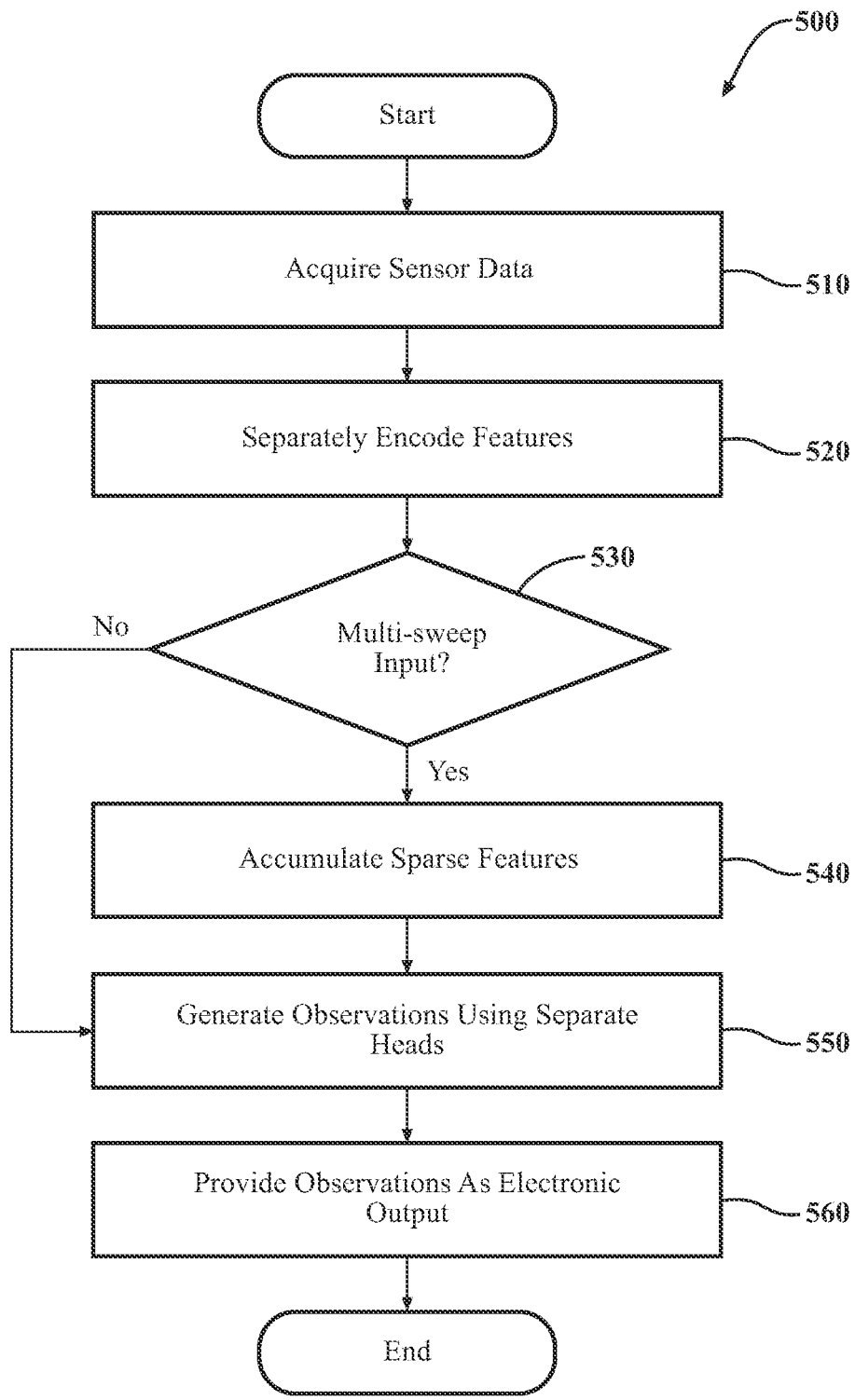
FIG. 5 is a flowchart illustrating one embodiment of a method for processing sensor data using a multi-task model.

Additional aspects of generating depth estimates and identifying dynamic objects from monocular images will be discussed in relation to FIG. 5. FIG. 5 illustrates a flowchart of a method 500 that is associated with inferring depth and dynamic objects from monocular images. Method 500 will be discussed from the perspective of the perception system 170. While method 500 is discussed in combination with the perception system 170, it should be appreciated that the method 500 is not limited to being implemented within the perception system 170 but is instead one example of a system that may implement the method 500.

At 510, the network module 220 acquires sensor data from multiple modalities. That is, in one arrangement, the different modalities correspond to different sensors that may be integrated within the vehicle 100. The sensors can include cameras, radars, LiDARs, sonars, and so on. Some of the different sensors are multi-sweep sensors meaning that the sensors emit energy, such as light, radio waves, etc. into the environment, and sense reflections of the energy to perceive aspects of the environment. Additionally, the energy may be emitted in a sweeping manner. In any case, multi-sweep sensors generally provide sparse information as opposed to a comprehensive representation of the environment. Moreover, the network module 220 can acquire the sensor data in different ways including either actively or passively (i.e., directly controlling the sensors or passively acquiring the sensor data from other systems of the vehicle). In any case, the sensor data generally provides perceptions about the surrounding environment of the vehicle 100.

At 520, the network module 220 separately encodes respective segments of the sensor data 240 according to an associated one of the different modalities. That is, for example, the network module 220 applies the separate encoders (i.e., vision backbone 325 and encoders 320) to the separate inputs associated with different modalities to form encoded features. The network module 220 can then fuse the encoded features together using separate fusion heads/blocks in order to combine the perceptions in a normalized form together.

At 530, the network module 220 may determine whether one of the inputs is a multi-sweep input. If so, then the network module 220 accumulates sparse features, as discussed at block 540. Otherwise, the process proceeds to generate observations at block 550, which, in one arrangement, involves using a single pathway of the detection head 345 or otherwise adapting or skipping the accumulation performed by the 3D detection head.

Figure 4:
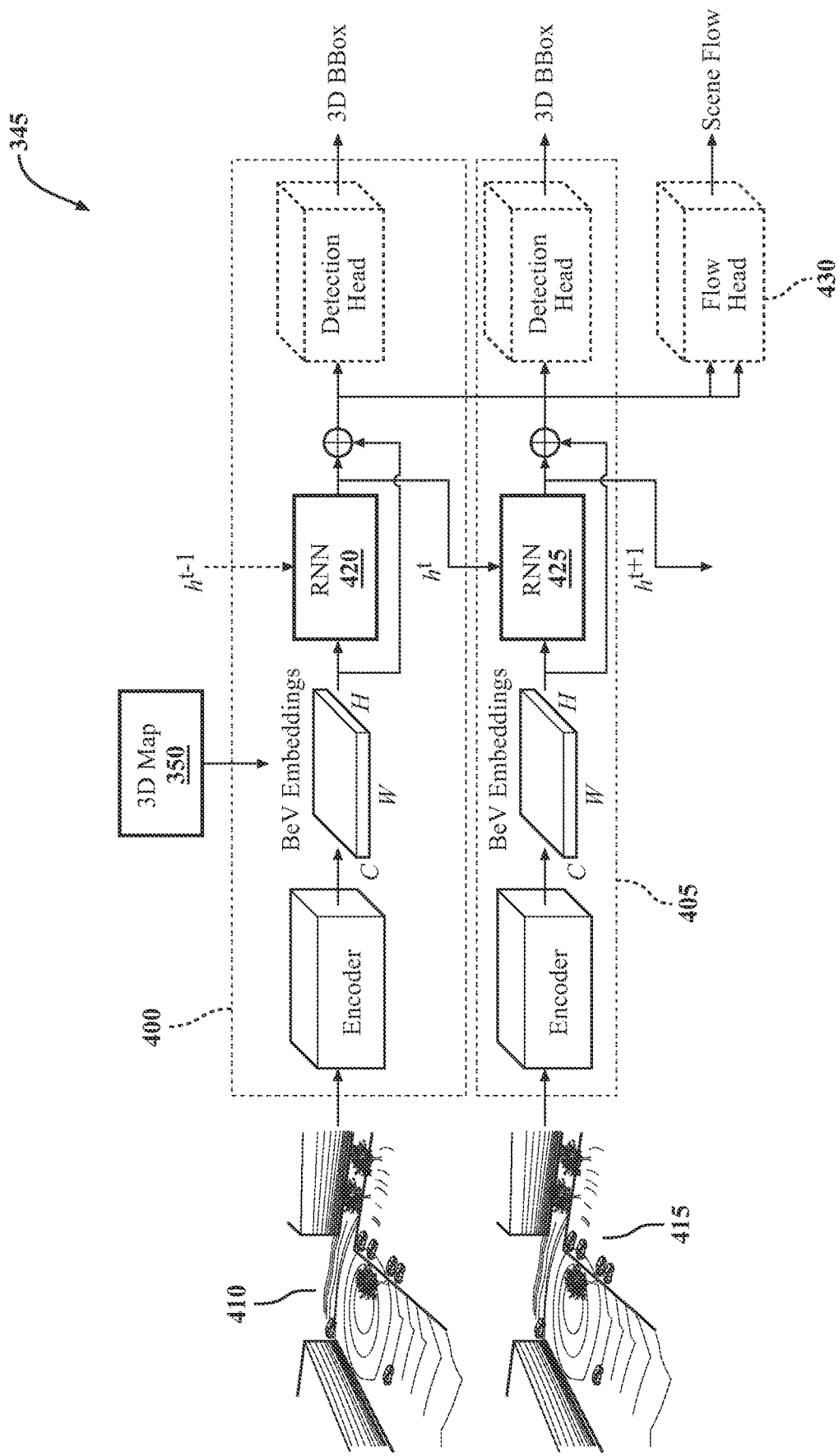
FIG. 4 illustrates one embodiment of a detection pipeline for multi-sweep inputs.

At 540, the network module 220 accumulates, using the separate parallel pipelines of the detector 345, sparse features associated with sparse sensor inputs to densify the sparse features into dense features. For example, in one arrangement, accumulating the sparse features involves processing depth maps derived from the sparse features and from two separate time steps, as shown in FIG. 4. The network module 220 controls the detector 345 to separately apply two separate pipelines/pathways 400 and 405 for the respective depth maps and uses separate recurrent neural networks (RNNs) 420 and 425 to accumulate the sparse features. As previously described, the network module 220 accumulates the sparse features over multiple timesteps for the depth map that is based on the encoded features from the multi-sweep inputs in order to improve the confidence of determinations since the multi-sweep inputs may not provide a comprehensive perception of the environment.

At 550, the network module 220 processes encoded and sparse features. For example, the network module 220 may provide encoded features to multiple different detection heads, including semantic segmentation, object instance identification, and so on. In particular, the network module 220 may provide the sparse features from the depth maps accumulated via the RNNs a 3D detection head, and a flow head of the detector 345. As an outcome, the network module 220 effectively generates three-dimensional bounding boxes that identify locations of objects and also scene flow for the depicted scene. In this way, the perception system 170 can improve the handling of sparse inputs from multi-sweep modalities.

At 560, the network module 220 provides observations according to the encoded features and the sparse features using the network as an electronic output.

It should be appreciated that the network module 220 can provide the electronic output 355, including detections from the detection head 345 to additional systems/modules in the vehicle 100 in order to control the operation of the modules and/or the vehicle 100 overall. In still further aspects, the network module 220 communicates the electronic outputs to a remote system (e.g., cloud-based system) as, for example, a mechanism for mapping the surrounding environment or for other purposes (e.g., traffic reporting, etc.). As one example, the network module 220, in one approach, uses the outputs 355 to map locations of obstacles in the surrounding environment and plan a trajectory that safely navigates the obstacles. Thus, the network module 220 may, in one embodiment, control the vehicle 100 to navigate through the surrounding environment according to the outputs 355.

In further aspects, the network module 220 conveys the electronic outputs to further internal systems/components of the vehicle 100, such as the automated driving module 160. By way of example, in one arrangement, the network module 220 generates the outputs 355 (including detections from the 3D detector 345) using the model 250 and conveys the electronic outputs 355 to the automated driving module 160. In this way, the perception system 170 informs the automated driving module 160 of depth estimates, objects, and so on to improve situational awareness and planning of the module 160. It should be appreciated that the automated driving module 160 is indicated as one example, and, in further arrangements, the network module 220 may provide the outputs 355 to the module 160 and/or other components in parallel or as a separate communication.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Such switching can be implemented in a suitable manner, now known or later developed. "Manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component, and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100.

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124 (e.g., 4 beam LiDAR), one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes a device, or component, that enables information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the perception system 170, and/or the automated driving module(s) 160 can be operatively connected to communicate with the various vehicle systems 140 and/or individual components thereof. For example, returning to FIG. 1, the processor(s) 110 and/or the automated driving module(s) 160 can be in communication to send and/or receive information from the various vehicle systems 140 to control the movement, speed, maneuvering, heading, direction, etc. of the vehicle 100. The processor(s) 110, the perception system 170, and/or the automated driving module(s) 160 may control some or all of these vehicle systems 140 and, thus, may be partially or fully autonomous.

The processor(s) 110, the perception system 170, and/or the automated driving module(s) 160 can be operatively connected to communicate with the various vehicle systems 140 and/or individual components thereof. For example, returning to FIG. 1, the processor(s) 110, the perception system 170, and/or the automated driving module(s) 160 can be in communication to send and/or receive information from the various vehicle systems 140 to control the movement, speed, maneuvering, heading, direction, etc. of the vehicle 100. The processor(s) 110, the perception system 170, and/or the automated driving module(s) 160 may control some or all of these vehicle systems 140.

The processor(s) 110, the perception system 170, and/or the automated driving module(s) 160 may be operable to control the navigation and/or maneuvering of the vehicle 100 by controlling one or more of the vehicle systems 140 and/or components thereof. For instance, when operating in an autonomous mode, the processor(s) 110, the perception system 170, and/or the automated driving module(s) 160 can control the direction and/or speed of the vehicle 100. The processor(s) 110, the perception system 170, and/or the automated driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the automated driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more automated driving modules 160. The automated driving module(s) 160 can be configured to receive data from the sensor system 120 and/or any other type of system capable of capturing information relating to the vehicle 100 and/or the external environment of the vehicle 100. In one or more arrangements, the automated driving module(s) 160 can use such data to generate one or more driving scene models. The automated driving module(s) 160 can determine a position and velocity of the vehicle 100. The automated driving module(s) 160 can determine the location of obstacles, obstacles, or other environmental features including traffic signs, trees, shrubs, neighboring vehicles, pedestrians, etc.

The automated driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The automated driving module(s) 160 either independently or in combination with the perception system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The automated driving module(s) 160 can be configured to implement determined driving maneuvers. The automated driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The automated driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-5, but the embodiments are not limited to the illustrated structure or application.

The flowcharts and block diagrams in the Figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, module, as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof

What is claimed is:

1. A perception system, comprising:
one or more processors;
a memory communicably coupled to the one or more processors and storing instructions that, when executed by the one or more processors, cause the one or more processors to:
acquire sensor data from multiple modalities;
separately encode respective segments of the sensor data according to an associated one of the multiple modalities to form encoded features using separate encoders of a network;
accumulate, in a detector, sparse features associated with sparse sensor inputs of the multiple modalities to densify the sparse features into dense features by processing depth maps from two separate time steps using a detector of the network that includes two separate pipelines for the respective depth maps; and
provide observations according to the encoded features and the sparse features using the network.

2. The perception system of claim 1, wherein the instructions to acquire the sensor data from the multiple modalities include instructions to receive the sensor data from at least one multi-sweep sensor.

3. The perception system of claim 1, wherein accumulate the sparse features include instructions to the two separate pipelines having recurrent neural networks (RNNs).

4. The perception system of claim 3, wherein the instructions to provide the observations include instructions to process the sparse features according to a detection head and a flow head of the detector to generate three-dimensional bounding boxes and scene flow for the sensor data.

5. The perception system of claim 1, wherein the instructions to separately encode the sensor data include instructions to selectively apply separate encoders to the respective segments of the sensor data according to available ones of the different modalities and fusing the encoded features together using separate fusion heads.

6. The perception system of claim 1, wherein the instructions to provide the observations include instructions to apply separate decoders to the encoded features that are associated with different functions of the network.

7. The perception system of claim 1, wherein the instructions to accumulate the sparse features include instructions to generate depth maps for respective segments of the sensor data associated with sparse inputs, including at least one of radar and LiDAR.

8. The perception system of claim 1, wherein the instructions to accumulate include instructions to accumulate the sparse features using a parallel pipeline that includes separate recurrent neural networks operating on successive inputs from the encoders.

9. A non-transitory computer-readable medium including instructions that, when executed by one or more processors, cause the one or more processors to:
   acquire sensor data from multiple modalities;
   separately encode respective segments of the sensor data according to an associated one of the multiple modalities to form encoded features using separate encoders of a network;
   accumulate, in a detector, sparse features associated with sparse sensor inputs of the multiple modalities to densify the sparse features into dense features by processing depth maps from two separate time steps using a detector of the network that includes two separate pipelines for the respective depth maps; and
   provide observations according to the encoded features and the sparse features using the network.

10. The non-transitory computer-readable medium of claim 9, wherein the instructions to acquire the sensor data from the multiple modalities include instructions to receive the sensor data from at least one multi-sweep sensor.

11. The non-transitory computer-readable medium of claim 9, wherein the two separate pipelines having recurrent neural networks (RNNs).

12. The non-transitory computer-readable medium of claim 11, wherein the instructions to provide the observations include instructions to process the sparse features according to a detection head and a flow head of the detector to generate three-dimensional bounding boxes and scene flow for the sensor data.

13. The non-transitory computer-readable medium of claim 9, wherein the instructions to separately encode the sensor data include instructions to selectively apply separate encoders to the respective segments of the sensor data according to available ones of the different modalities and fusing the encoded features together using separate fusion heads.

14. A method, comprising:
   acquiring sensor data from multiple modalities;
   separately encoding respective segments of the sensor data according to an associated one of the multiple modalities to form encoded features using separate encoders of a network;
   accumulating, in a detector, sparse features associated with sparse sensor inputs of the multiple modalities to densify the sparse features into dense features by processing depth maps from two separate time steps using a detector of the network that includes two separate pipelines for the respective depth maps; and
   providing observations according to the encoded features and the sparse features using the network.

15. The method of claim 14, wherein acquiring the sensor data from the multiple modalities includes receiving the sensor data from at least one multi-sweep sensor.

16. The method of claim 14, wherein the two separate pipelines having recurrent neural networks (RNNs).

17. The method of claim 16, wherein providing the observations includes processing the sparse features according to a detection head and a flow head of the detector to generate three-dimensional bounding boxes and scene flow for the sensor data.

18. The method of claim 14, wherein separately encoding the sensor data includes selectively applying separate encoders to the respective segments of the sensor data according to available ones of the multiple modalities and fusing the encoded features together using separate fusion heads.

19. The method of claim 14, wherein providing the observations includes applying separate decoders to the encoded features that are associated with different functions of the network.

20. The method of claim 14, wherein accumulating the sparse features includes generating depth maps for respective segments of the sensor data associated with sparse inputs, including at least one of radar and LiDAR.

* * * * *